(12) United States Patent
Lin et al.

(10) Patent No.: US 7,914,245 B2
(45) Date of Patent: Mar. 29, 2011

(54) SCREW (75) Inventors: Ching-Guei Lin, Lujhu Township, Kaohsiung County (TW); Mau-Chang Wu, Lujhu Township, Kaohsiung County (TW)

(73) Assignee: Channg Chin Industry Corp., Kaohsiung County (TW)

( * ) Notice: Subject to any disclaimer, the term of this patent is extended or adjusted under 35 U.S.C. 154(b) by 165 days.

(21) Appl. No.: 12/285,900

(22) Filed: Oct. 16, 2008

(65) Prior Publication Data

US 2009/0047096 A1    Feb. 19, 2009

Related U.S. Application Data (63) Continuation-in-part of application No. 11/585,153, filed on Oct. 24, 2006, now abandoned.

(51) Int. Cl.
*F16B 25/00* (2006.01)
(52) U.S. Cl. ................ 411/386; 411/387.3; 411/411
(58) Field of Classification Search .......... 411/386, 411/387.2, 387.3, 387.4, 411, 412, 413, 415
See application file for complete search history.

(56) References Cited

U.S. PATENT DOCUMENTS

| 4,150,702 | A | * | 4/1979 | Holmes | 411/310 |
| 5,569,009 | A | * | 10/1996 | Suzuki | 411/413 |
| 5,735,653 | A | * | 4/1998 | Schiefer et al. | 411/82 |
| 6,030,162 | A | * | 2/2000 | Huebner | 411/413 |
| 6,116,832 | A | * | 9/2000 | Wolf et al. | 411/383 |
| 6,984,235 | B2 | * | 1/2006 | Huebner | 470/10 |

* cited by examiner

*Primary Examiner* — Gary Estremsky
(74) *Attorney, Agent, or Firm* — Rosenberg, Klein & Lee (57) ABSTRACT The present invention pertains to a screw with a first thread section comprised of a trailing and a leading thread segments respectively spiraled on a shank and a tip section. Distinctly, the leading thread segment defines a plane surface thereon to convergently engage with an adjacently thread peak on the trailing thread segment and further constructs a thread width greater than that of the trailing thread segment while aligning the two thread segments with a correspondent profile thread height. Such configuration of the plane surface accompanies its larger thread width to enlarge a drilling channel and accordingly renders an easy entry of the trailing thread segment into an object with less friction and higher screwing speed. Additionally, the debris is partially removed through the void between the enlarged channel and the trailing thread segment to avoid cracking the object, decrease drilling torque, and enhance the fastening capability.

7 Claims, 7 Drawing Sheets

FIG.9

SCREW

CROSS-REFERENCE TO RELATED APPLICATION

This application is a continuation-in-part of the U.S. patent application Ser. No. 11/585,153, filed on Oct. 24, 2006, now abandoned; the subject matter is incorporated herein by reference in its entirety.

BACKGROUND OF THE INVENTION

1. Field of the Invention

The present invention relates to a screw, in particular to a screw with lower screwing torque and higher screwing speed.

2. Description of the Related Art

Figure 1:
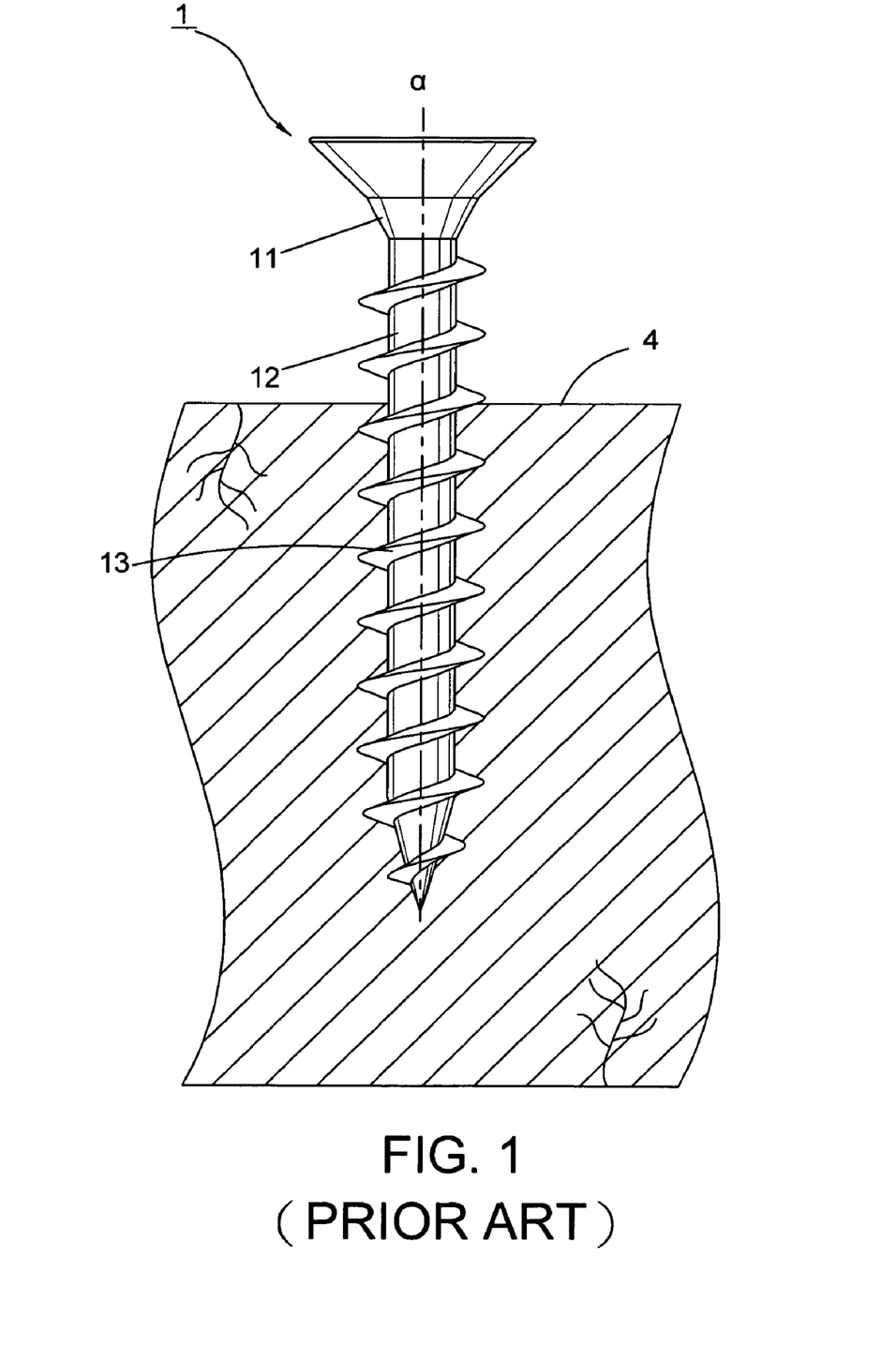
FIG. 1 is a schematic view showing a conventional screw screwing into the object.

A conventional screw 1 disclosed in FIG. 1 generally comprises a head 11, a shank 12 extending therefrom, and a set of threads 13 spirally arranged on the shank 12 along a shank axis α. While initially directing the shank 12 toward an object 4 (i.e. chipboard), users impart a torque force upon the head 11 to drive the thread 13 rotarily cutting the object 4 and progressively drill the shank 12 into the object 4. However, when driving the screw 1 into an object, debris to be extruded out of a channeled hole acts as a counter-acting force against the driven threads 13, which increases the amount of labor and time required to drive the screw 1.

Figure 2:
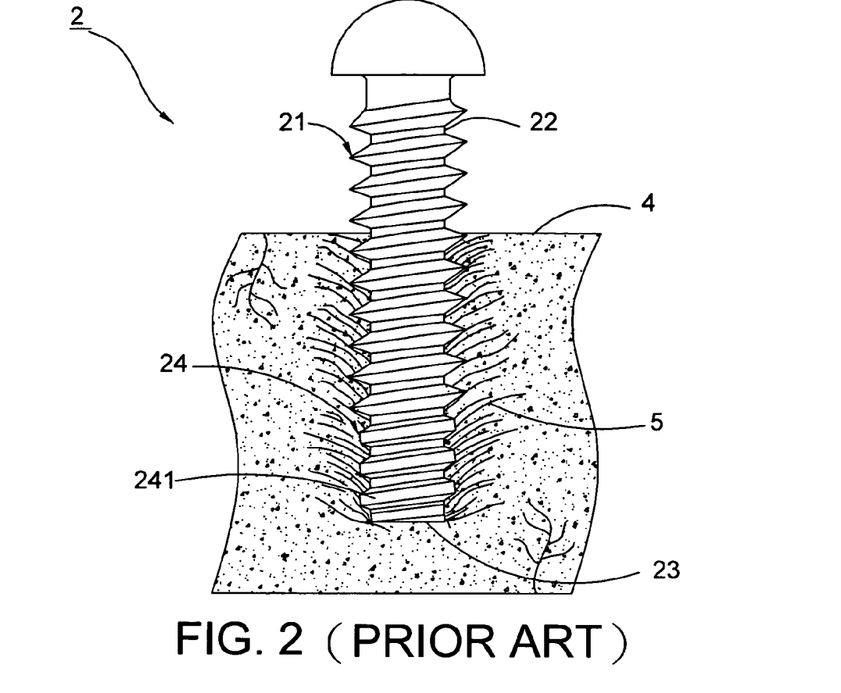
FIG. 2 is a schematic view showing a prior art in drilling, issued by U.S. Pat. No. 3,454,070.
Figure 3:
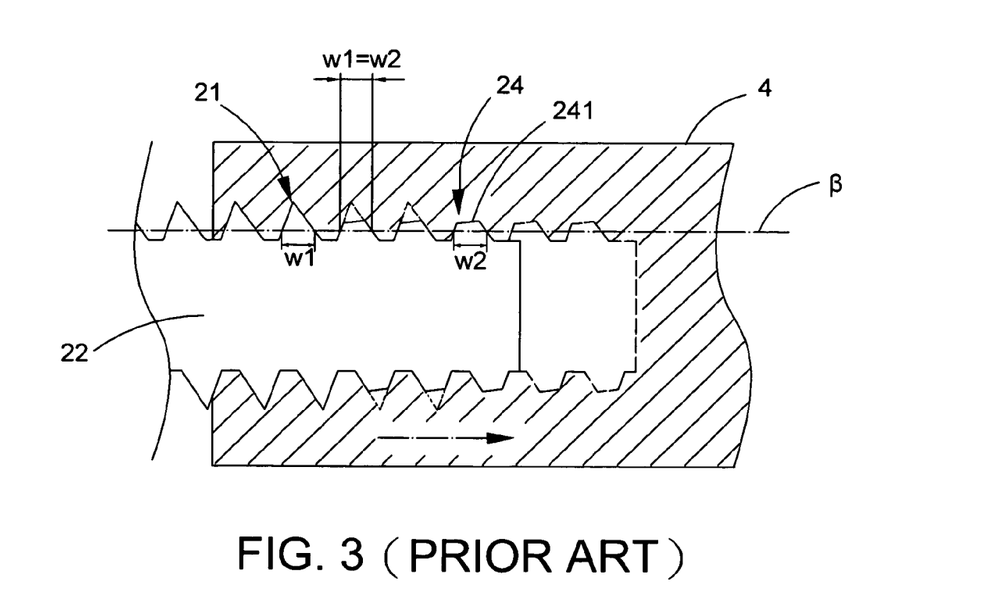
FIG. 3 is a longitudinal cross-sectional view showing of FIG. 2.

A fastener device 2 of a prior art for engaging an initial threaded female member or workpiece, disclosed by H. F. Phipard, Jr. in U.S. Pat. No. 3,454,070, essentially includes a set of upper thread(s) 21 and a shank 22 tapered to a tip end at 23. The prior art further presents that distal threads 24 proximate to the tip 23 are clearly planar as shown in FIG. 2, namely to juxtaposedly align each planar surface 241 on each distal thread. Further, it distinctly performs in FIG. 3 that the general formation of thread peak on the threads 21 provides with a thread width W1 consistent with that W2 of the plane surface on the distal threads 24 with respect to a contour line β designating at a certain height range.

Still further, when initially driving the screw fastener 2 into a pre-drilled hole of a workpiece 4, such plane surfaces 241 substantially substitute deflecting debris 5 of the workpiece aside for exerting themselves to chip those debris, so as to create an interior track inside the workpiece and predetermine the range of clearances. However, such debris would interfere with the advance of the screw 2 when it turns to immediately surround the shank 22, which may incur a larger drilling torque. In the subsequently gradual drilling toward the upper threads 21 along the track as arrowed, the debris 5 inevitably become jam or accumulated within the workpiece 4 since the configuration of the equal thread width (W1=W2) renders the upper threads 21 densely engage with the tracks and has rather no space formed therebetween to acceptably extrude redundant debris 5 out of the workpiece. Hence, Phipard's fastener potentially results of a progressive increment of the screwing resistance and drilling torque during the travel of the screw 2 through the workpiece and even causes the destruction of the workpiece 4. It still fails to overcome the deficiencies of the conventional screw 1.

SUMMARY OF THE INVENTION

Therefore, the object of the present invention is to provide a screw which facilitates to attain a lower drilling torque and a speedy screwing.

The screw in accordance with the present invention essentially comprises a head, a shank extending from the head, and a first thread section spirally disposed on the shank; wherein the shank forms a tip section and tapers off at a distal gimlet tip. The first thread section and the tip section respectively have a trailing thread segment and a leading thread segment helically disposed thereon; the trailing thread segment further forms a thread peak, and the leading thread segment specifically defines a plane surface thereon, thereby successively spiraling the plane surface from the tip section to convergently engage with the thread peak. Further, the leading thread segment has a greater thread width than that of the trailing thread segment while aligning them with a same level of thread height. Accordingly, the initially guidance of the plane surface and the different thread widths of the two thread segments cooperate to make the expansion of a screwing channel and permit the trailing thread segment to easily follow the channel and proceed chipping the debris with a less friction and a higher speed. It also beneficially renders a smooth move of the redundant cutting debris through a void between the enlarged channel and the trailing thread segment and receives the remaining debris filling within the void, so as to more decrease the screwing torque, to avoid the crack on the object, and to maintain a better effect at screwing.

The advantages of the present invention over the known prior arts will become more apparent to those of ordinary skilled in the art by reading the following descriptions with the relating drawings.

DETAILED DESCRIPTION OF THE PREFERRED EMBODIMENTS

Before in greater detail, it should note that the like elements are denoted by similar reference numerals throughout the disclosure.

Figure 4:
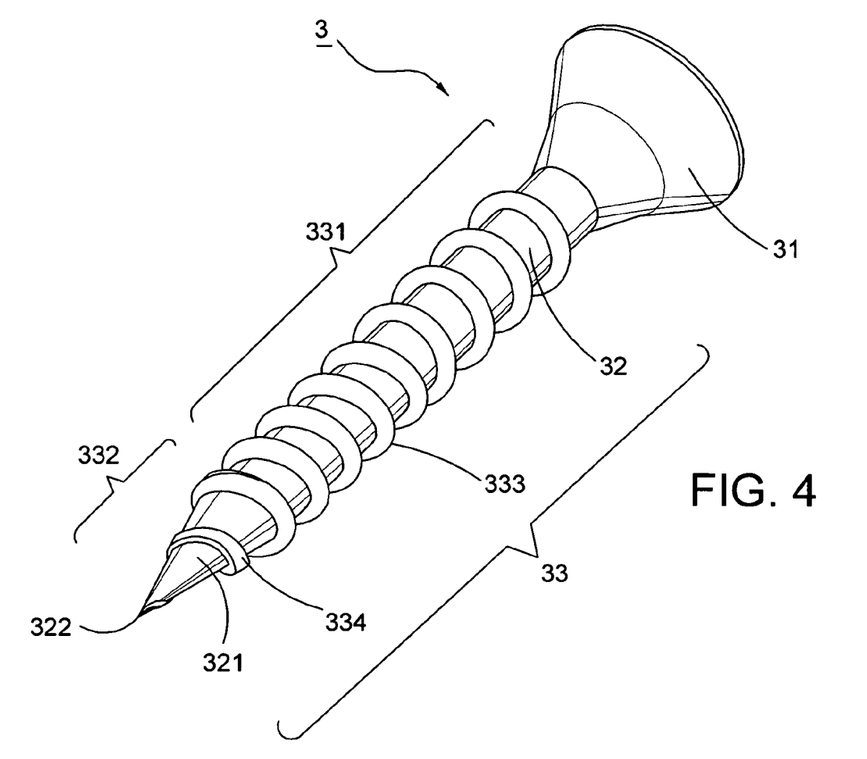
FIG. 4 is a perspective view showing a first preferred embodiment of the present invention.
Figure 4A:
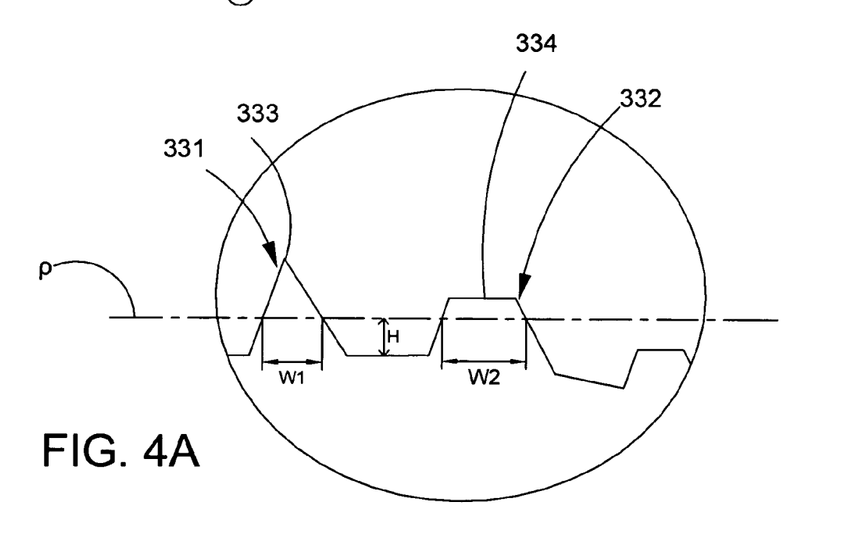
FIG. 4A is a partial enlarged view showing of FIG. 4.
Figure 5:
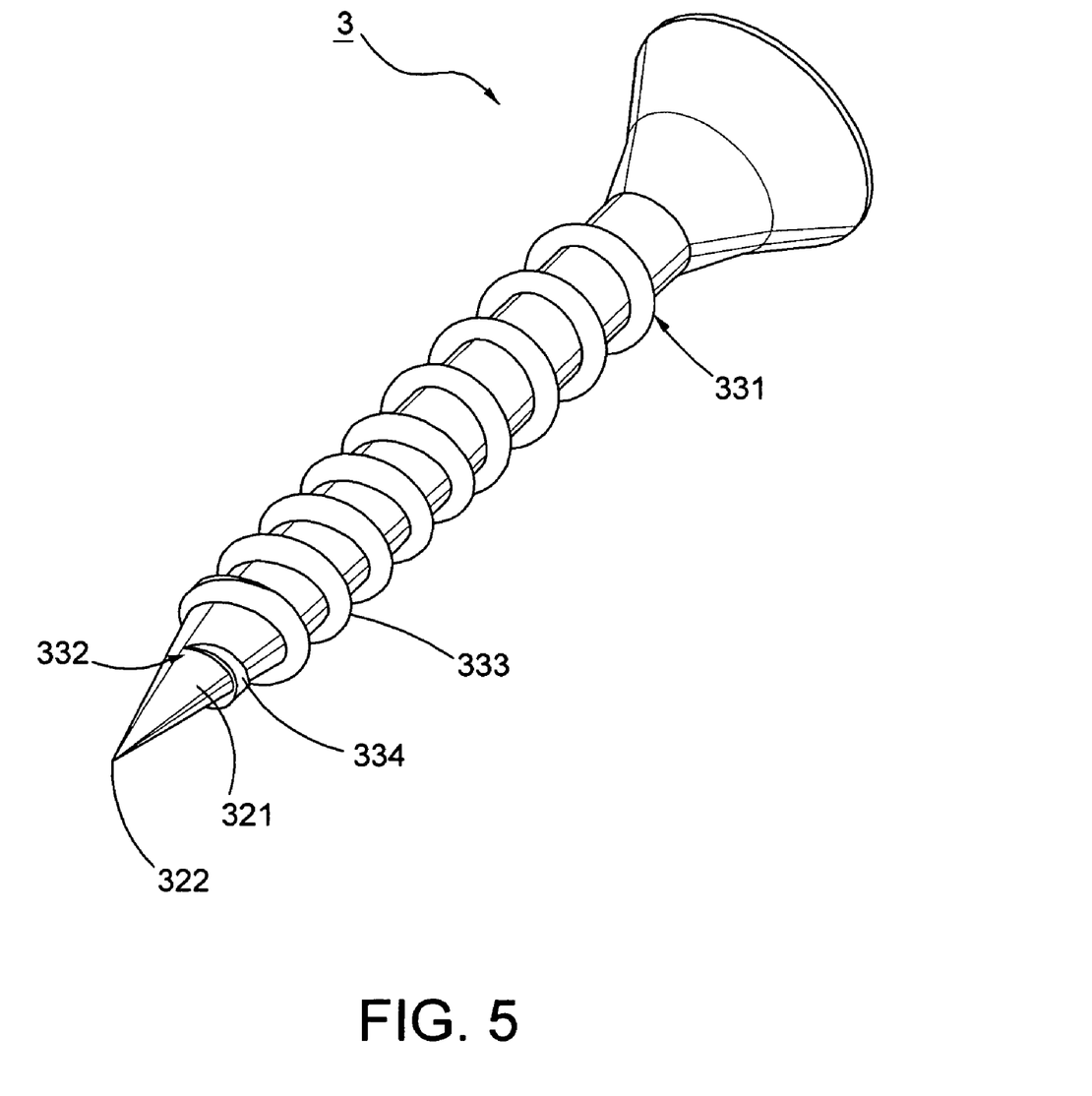
FIG. 5 is a perspective view showing a second preferred embodiment of the present invention.

Referring to FIG. 4, a screw 3 of the first preferred embodiment of the present invention has a head 31, a shank 32 longitudinally extending from the head 31, and a first thread section 33 spirally disposed on shank 32; wherein the head 31 sets a recess thereon (not shown in figures) for being adapted to various types of screwdrivers or relevant tools in conformity with user's demand. It is not restricted to the recess that is a sort of Phillip, slotted, and other different kinds of shapes. Besides, the shank 32 provides with a tip section 321 and terminates at a gimlet tip 322. Further, the first thread section 33 has a trailing thread segment 331 helically disposed on the shank 32 and a leading thread segment 332 spirally defined on the tip section 321. The essential characteristics of the present invention include threads of trailing thread segment 331 forming a respective thread peak 333 thereon and threads of the leading thread segment 332 constructing a plane surface 334 thereon so as to perform the outer diameter of the leading thread segment 332 smaller than that of the trailing thread segment 331; meanwhile, it is considerably shown in FIG. 5 to extend the leading thread segment 332 upwardly from the tip section 321 escaping the gimlet tip 322 or shown in FIG. 4 to coincidently start at the gimlet tip 322, thereupon the plane surface 324 can spiral round the tip section 321 and convergently terminate at the thread peak 333 of the trailing thread segment 331. Herein it is adopted in following descriptions that the leading thread segment 332 extends upwardly from the gimlet tip 322 to engage with the trailing thread segment 331. Of further import, the leading thread segment 332 shown in FIG. 4A provides with a thread width W2 greater than a thread width W1 of the trailing thread segment 331 while aligning both the trailing and leading thread segments 331, 332 through a distinctly contour line, that is, with respect to a rectilinear line ρ by a correspondent profile thread height H.

Figure 6:
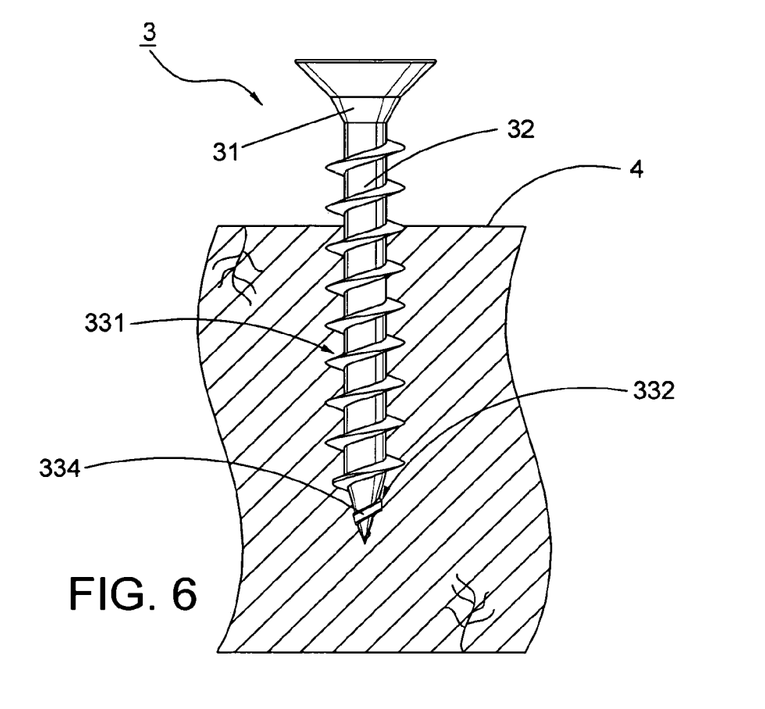
FIG. 6 is a schematic view showing of FIG. 4 screwed into a workpiece.
Figure 7:
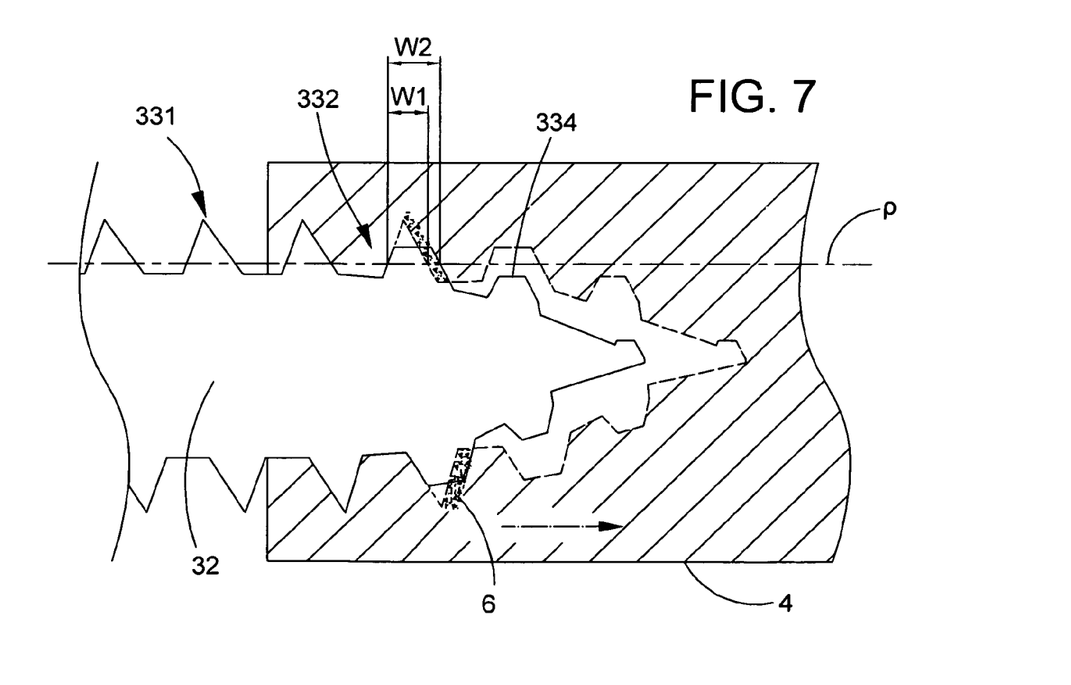
FIG. 7 is a longitudinal cross-sectional view showing of FIG. 6.

Referring to FIGS. 6 and 7, upon the application of torque force or axial pressure to the head 31 for driving the screw 3 into an object 4 (for instance of a particle board compounded of wood chips, rubbers, binders, and etc. under the conditions of a high-pressure laminating), the plane surface 334 of the leading thread segment 332 with its large thread width W2 initially drills into the object 4 to expand a screwing channel. Since the channel is enlarged, the trailing thread segment 331 can incessantly and speedily enter into the object 4 with lower screwing torque and substantially execute the cutting action. More explicitly, while progressively drilling the shank 32 into the object 4 as arrowed, each thread of the trailing thread segment 331 swaggeringly follows the channel created by the leading thread segment 332 (shown by phantom lines in FIG. 7) and simultaneously the developing of the redundant cutting debris is allowed to smoothly travel through a void 6 generated between the enlarged channel and the trailing thread segment 331, which hence prevents the occurrence of accumulating too much redundant debris among the screw 3 and avoids generating a reverse resistance to the torque force as well as severely resulting in fracturing the object 4 during the manipulation. Therefore, the cooperation of the plane surface 334 and the discrepancies between thread widths W1, W2 (W1<W2) of the thread segments 331, 332 substantially facilitate to more increase the screwing speed and to lower the screwing torque during operation. Additionally, the remaining debris can also fills among the void 6 so as to enhance the fastening firmness.

Figure 8:
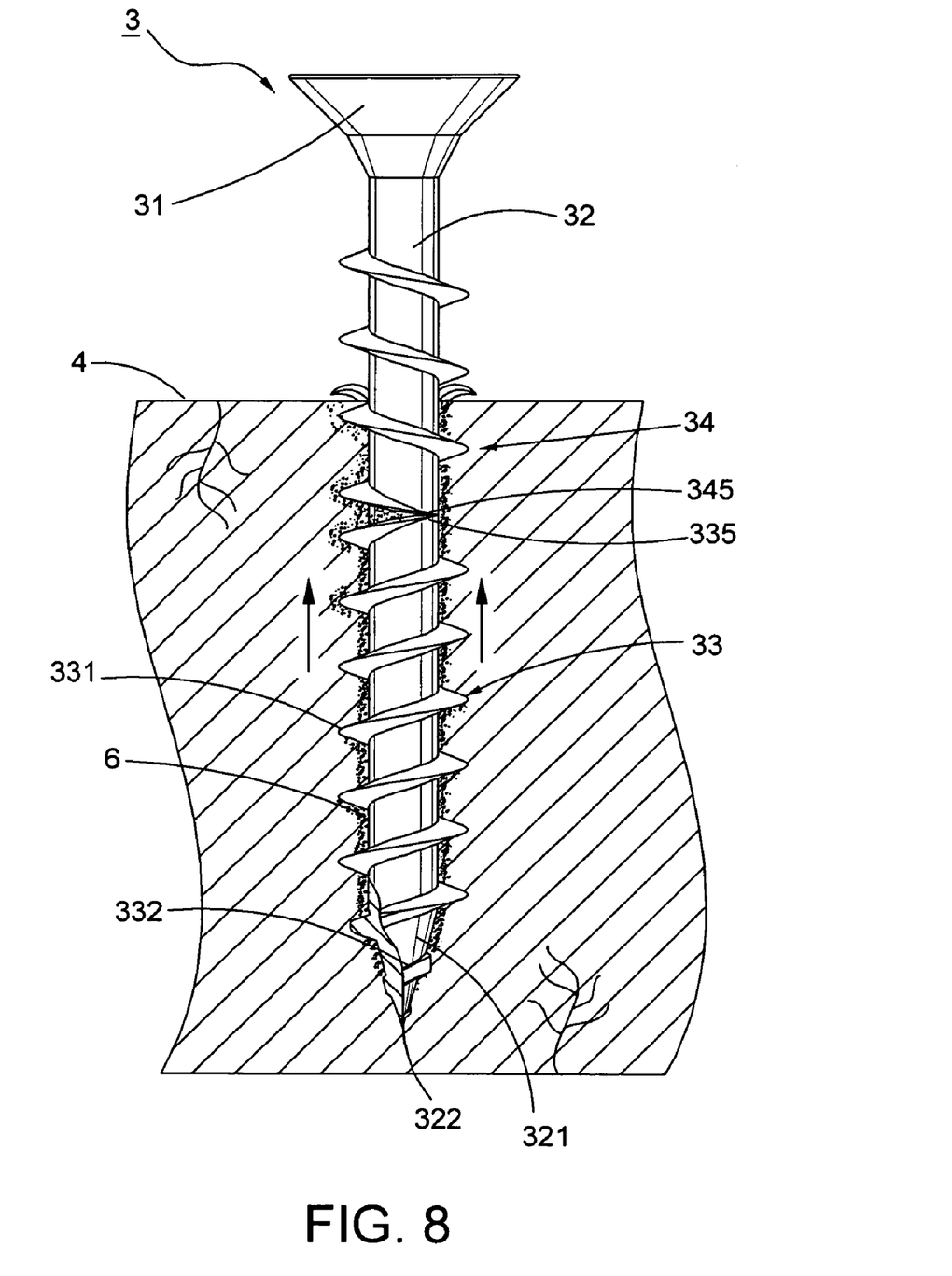
FIG. 8 is a schematic view showing a third preferred embodiment of the present invention.

The screw 3 of the third preferred embodiment in FIG. 8 would be utilized in a fashion similar to the previous embodiment in connection with FIG. 4 and essentially comprised of a head 31, a shank 32 connecting thereto with a tip section 321 and a gimlet tip 322 at its distal, and a first thread section 33 including two thread segments 331, 332 respectively spiraled on the shank 32 and the tip section 321; characterized in that a second thread section 34 is defined on the shank 32 over the first thread section 33 and located proximately to the head 31. Further, the second thread section 34 and the first thread section 33 both run in reverse revolutions. It is adopted that the first thread section 33 is formed in clockwise and the second thread section 34 is in counterclockwise. Two thread ends 335, 345 of the first and the second thread sections 33, 34 coincidently engage with each other.

By such arrangement, the redundant debris can be more efficiently extruded from the object 4 through the void 6 between the channel and the trailing thread segment 331 and along the engagement of the two thread ends 335, 345 of the two thread sections 33, 34, thereby more achieving diminution of the screwing torque and a speedy screwing. Further, the remaining debris keeps filling the void 6 and distributively rests among the two thread sections 33, 34 through the guidance of the convergent thread ends 335, 345 when the counterclockwise second thread section 34 in turn squeeze the debris back within the object 4, so as to more enhance the fastening effect and avoid the loosening under the counteraction of the two reverse thread sections 33, 34.

Figure 9:
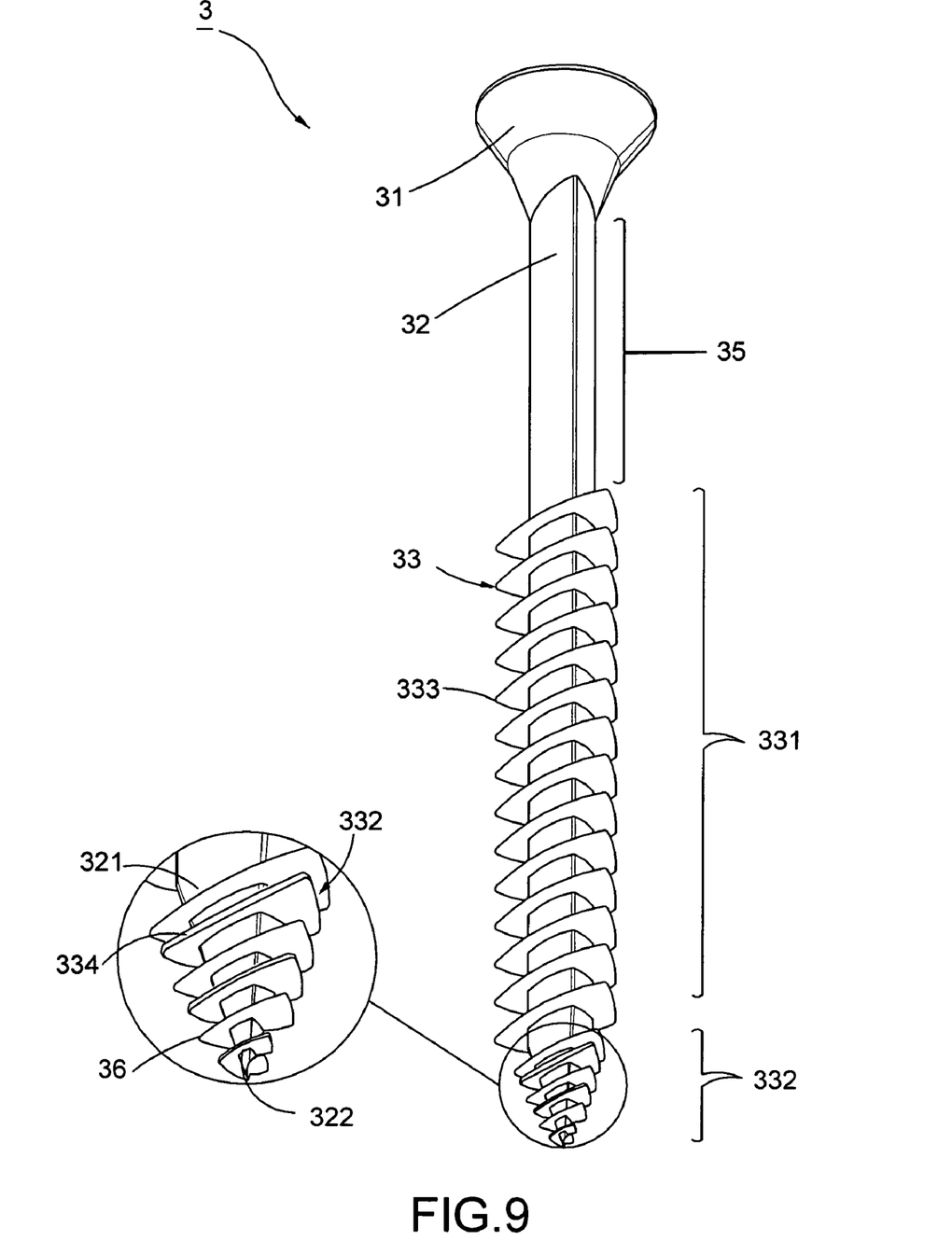
FIG. 9 is a perspective view showing a fourth preferred embodiment of the present invention.

Referring to FIG. 9, the fourth preferred embodiment of the present invention still comprises a head 31, a shank 32 having a tip section 321 and a gimlet tip 322 formed thereon, and a first thread section 33 provided with two thread segments 331, 332 that has respective thread peak and planar surface 333, 334. This embodiment particularly includes the increments of a smooth region 35 throughout the shank 32 between the head 31 and an auxiliary third thread section 36 on the tip section 321 alternating with the leading thread segment 332. The first thread section 33, the shank 32, and the third thread section 36 are all in a substantially triangularly contoured cross-section. It is not restricted that the tip section 321 herein would be in triangular; maybe a cone-shaped style would be possible as well. When in drilling, such triangular configuration mainly conduces to reduce the contacting area with the object (not shown) and decrease the friction resistance. It also distinctly makes application of the third thread section 36 to firmly prop against the object for more enhancing the anti-loosen effect and to prevent stripping a cladding layer from the screw. Hence, the screw 3 coated with the cladding layer is efficient at anti-rusting and insulation.

To sum up, the present invention takes advantages of a plane surface on the leading thread segment spirally converging toward the thread peak of the trailing thread segment and of different thread widths with respect to the same thread height between the two thread segments. By the plane surface possessed of a larger thread width, the leading thread segment initially enlarges the screwing channel and allows an easy entry of the trailing thread segment into the object and a preferable remove of redundant debris along a void between the channel and the trailing thread, hence to attain a lower drilling torque and speedy screwing and further to enhance the fastening firmness by filling the void with remaining debris. The present invention can also have the triangular shank and threads to more attain the diminution of friction resistance and enhance anti-rusting and isolating effects.

While we have shown and described the embodiment in accordance with the present invention, it should be clear to those skilled in the art that further embodiments may be made without departing from the scope of the present invention.

We claim:
1. A screw for fastening objects, comprising:
a head;
an elongated tapering shank having a first end displaced from a second end, said first end being integrally coupled to said head, and said second end forming a tip section terminating at a point to define a gimlet tip; and
a trailing thread segment and a leading thread segment defining a continuous thread helically disposed on the length of said shank, said trailing thread segment being defined by helical thread having a pointed peak disposed around shank, and said leading thread segment being defined by helical thread having a flattened crest disposed around said tip section and tapered off to terminate at said pointed peak;

whereby the leading thread segment includes a cross section having a base width that is wider than the base width of said trailing thread segment.

2. The screw as claimed in claim 1, wherein a second thread section is defined on said shank over said first thread section and located proximately to said head; said second thread section and said first thread section run in reverse revolutions, and a thread end of said first thread section coincidentally engages with a thread end of said second thread section.

3. The screw as claimed in claim 1, wherein said leading thread segment extends upwardly from said gimlet tip to engage with said trailing thread segment.

4. The screw as claimed in claim 1, wherein said shank is formed of a triangular shape.

5. The screw as claimed in claim 1, wherein said trailing thread section is formed of a triangular shape.

6. The screw as claimed in claim 1, wherein a smooth region is disposed on said shank between said head and said trailing thread section.

7. The screw as claimed in claim 1 wherein said helical thread of said leading thread segment further includes at least one pointed peak portion alternatingly arranged with a said flattened crest portion.

* * * * *